Patented Feb. 25, 1936

2,031,802

UNITED STATES PATENT OFFICE 2,031,802

RECOVERY OF SULPHUR DIOXIDE FROM GAS MIXTURES

Daniel Tyrer, Norton-on-Tees, England, assignor to Imperial Chemical Industries Limited, a corporation of Great Britain No Drawing. Application May 6, 1933, Serial No. 669,789. In Great Britain May 6, 1932

1 Claim. (Cl. 23—178)

This invention relates to processes of the kind in which gases containing sulphur dioxide in small concentration, e. g. gases derived from the roasting of sulphide ores, are treated with a suitable solvent from which the sulphur dioxide is subsequently expelled by heating and/or reduction of pressure, the regenerated solvent being used again for dissolving further quantities of sulphur dioxide. These processes are hereinafter referred to as regenerative absorption processes for the recovery of $SO_2$.

It has previously been proposed to employ various non-aqueous solvents for this purpose, but such solvents are expensive in use and losses are difficult to avoid. It has also been proposed to use water as a solvent, but in this case the solubility is too small for economic working and large volumes of water have to be circulated and heated.

I have now found that excellent solvents for carrying out the above process are afforded by aqueous solutions containing one or more salts of substantially non-volatile acids which have dissociation constants lying between $1 \times 10^{-2}$ and $1 \times 10^{-5}$, measured at a dilution of 40 litres per gm. molecule and at a temperature of 25° C. On absorption of sulphur dioxide and consequent generation of sulphurous acid in solution, double decomposition occurs and an equilibrium is set up between the salt of the non-volatile acid and sulphurous acid on the one hand and a sulphite or bisulphite and the free non-volatile acid on the other hand. If the non-volatile acid is suitably chosen having regard to its dissociation constant, this double decomposition will proceed sufficiently far in the direction of sulphite or bisulphite and free acid to enable considerable quantities of sulphur dioxide to be absorbed in the solution. On heating the solution, however, sulphur dioxide gas is expelled, the equilibrium thereby being disturbed, and provided the acid employed is non-volatile at the temperature of regeneration, practically the whole of the sulphur dioxide may be recovered.

Suitable non-volatile acids for the purpose of the invention are lactic acid, glycollic acid, citric acid, or ortho-phosphoric acid, the first dissociation constants of which (measured at a dilution of 40 litres per gm. molecule and at a temperature of 25° C.) are $1.4 \times 10^{-4}$, $1.5 \times 10^{-4}$, $1 \times 10^{-3}$ and $1 \times 10^{-2}$ respectively. In the case of orthophosphoric acid, it is preferred that the quantities of acid and basic radical employed should be in such proportion as to afford a salt having the general formula $MH_2PO_4$. The basic radical may be an alkali or alkaline earth metal, or ammonia or any other base which does not lead to undesirable precipitation. In general, when the absorption is carried out in an ordinary tower scrubber, it is preferable to choose a salt of a metal which is soluble and forms soluble sulphites and bisulphites but an insoluble salt may be used as a suspension where a suitable scrubber is employed. For any given salt the amount of $SO_2$ that can be absorbed is roughly proportional to the amount of salt that can be dissolved or held in suspension. The efficiency of the process may accordingly be improved by using a solution of two or more salts, e. g. $NaH_2PO_4$ plus $NH_4H_2PO_4$, and this may be still further improved by adding a compound such as $MgHPO_4$ which is maintained in suspension. The mixed salts need not be derived from the same acid or basic radicals, e. g. sodium citrate may be mixed with mono-ammonium phosphate.

When the process of the invention is employed for treating gases containing free oxygen a certain amount of the sulphur dioxide in solution will be oxidized to sulphuric acid, and the solution will consequently become progressively richer in sulphuric acid. As sulphuric acid is a much stronger acid than sulphurous acid, an increasing proportion of the salts responsible for the absorption of $SO_2$ will become unavailable for this purpose and the efficiency of the absorption process will be seriously diminished. In order to maintain the efficiency of the process the concentration of sulphuric acid must be kept low, for example by purging a portion of the circulating liquor from time to time and replacing it with fresh liquor not containing sulphuric acid. Alternatively, the circulating liquor or a portion thereof may be treated to remove the sulphuric acid in any suitable way.

The salts of the non-volatile acids should be selected with regard to the concentration of the sulphur dioxide in the gas under treatment. It will be evident that, when treating a gas very weak in sulphur dioxide, the equilibrium concentration of the sulphur dioxide physically dissolved in the absorbent will be correspondingly small, and in order, therefore, to obtain a substantial quantity of sulphur dioxide dissolved in a given quantity of liquor the liquor should be of a relatively less acid nature. That is to say, in treating gases weak in sulphur dioxide a salt of a relatively weak acid, e. g. sodium citrate, should be employed, while in treating gases rich in sulphur dioxide a salt of a stronger acid, e. g. ammonium phosphate, should be employed. Alternatively, mixtures of salts of relatively weak and relatively strong acids may be employed and the ratio of the salts may be adjusted in accordance with the concentration of the sulphur dioxide.

Example 1

A solution containing 15 gms. of sodium citrate ($C_6O_4H_5Na_3.5\frac{1}{2}H_2O$) in 250 c. c. of solution was used in a bubbler to wash a gas mixture containing 10% sulphur dioxide and 90% of air. When absorption was complete it was found that the solution had absorbed 7 gms. of sulphur dioxide per 100 c. c. of solution. The solution thus obtained was regenerated by heating to its boiling point and in this manner a concentrated sulphur dioxide gas was recovered from the solution, amounting in all to 5 gms. of sulphur dioxide per 100 c. c. of solution regenerated.

Example 2

A gas containing 10% sulphur dioxide was washed with an aqueous solution containing 25 gms. of mono-ammonium phosphate per 100 c. c. and 5.5 gms. of sulphur dioxide per 100 c. c. of solution were thus absorbed. The solution was then heated and the whole of the absorbed sulphur dioxide recovered.

The experiment was repeated employing a solution containing, in addition to the mono-ammonium phosphate, about 15 gms. of sodium citrate and in this case 9.5 gms. of sulphur dioxide were absorbed, 9 gms. being recovered on heating under similar conditions.

Example 3

1000 cubic metres per hour of a cooled cleaned smelter gas, containing 5% by volume of sulphur dioxide were scrubbed in a tower in countercurrent with 2 cubic metres per hour of an aqueous liquor containing 30 gms. of monosodium phosphate and 10 gms. of sodium citrate per 100 c. c. This liquor was obtained from the regeneration step in a previous cycle and contained, in addition to the above constituents, about 1% of sulphur dioxide in the form of sulphite.

The heat of solution of the $SO_2$ caused an appreciable temperature rise of the liquor. To counteract this effect, a part of the effluent liquor was cooled and returned to a point about half way down the scrubbing tower. The effluent liquor contained approximately 6.5 gms. of $SO_2$ per 100 c. c. whilst the scrubbed gas contained only 0.1% $SO_2$ by volume.

The liquor containing the dissolved $SO_2$ was then preheated to a temperature of 85–90° C. and fed down a second packed tower, provided at its base with a steam coil for heating the liquor to its boiling point, the dissolved $SO_2$ being driven off by the rising current of steam.

The hot regenerated liquor leaving the base of the regenerator tower was first used to preheat the incoming cold liquor, after which it was further cooled with water and returned to the top of the scrubbing tower.

The mixture of $SO_2$ and steam leaving the top of the regenerator tower was cooled, and substantially pure sulphur dioxide was obtained at the rate of approximately 49 cubic metres per hour (calculated as a dry gas).

From time to time a portion of the scrubbing liquor was cooled and treated for the removal of sulphuric acid. Water was added to the system as required, to compensate for that lost as steam during the regeneration.

I claim:

A process for the regenerative absorption of sulphur dioxide which includes the step of washing an $SO_2$-containing gas with an aqueous solution containing a soluble mono-basic phosphate and sodium citrate.

DANIEL TYRER.